United States Patent
Neidhöfer et al.

[11] Patent Number: 5,693,996
[45] Date of Patent: Dec. 2, 1997

[54] DEVICE FOR HOLDING THE BAR ENDS OF A STATOR WINDING IN A DYNAMOELECTRIC MACHINE

[75] Inventors: Gerhard Neidhöfer, Hausen b. Brugg; Willibald Zerlik, Birr, both of Switzerland

[73] Assignee: Asea Brown Boveri AG, Baden, Switzerland

[21] Appl. No.: 412,579

[22] Filed: Mar. 29, 1995

[30] Foreign Application Priority Data

Jul. 9, 1994 [DE] Germany ............... 44 24 215.8

[51] Int. Cl.[6] .................. H02K 3/46; H02K 5/24
[52] U.S. Cl. ........................ 310/260; 310/51
[58] Field of Search ..................... 310/254, 260, 310/42, 43, 45, 270, 214, 51

[56] References Cited

U.S. PATENT DOCUMENTS

| | | | |
|---|---|---|---|
| 3,649,860 | 3/1972 | Richardson | 310/260 |
| 4,088,913 | 5/1978 | Prigorovsky et al. | 310/260 |
| 4,217,515 | 8/1980 | Long et al. | 310/270 |
| 4,238,339 | 12/1980 | Khutoretsky et al. | 310/260 |
| 4,496,870 | 1/1985 | Antonov et al. | 310/260 |
| 4,501,985 | 2/1985 | Dobson et al. | 310/270 |
| 4,800,314 | 1/1989 | Ward et al. | 310/260 |
| 5,051,642 | 9/1991 | Hediger | 310/260 |
| 5,355,046 | 10/1994 | Weigelt | 310/260 |
| 5,436,520 | 7/1995 | Huber | 310/260 |
| 5,485,050 | 1/1996 | Zimmerman | 310/260 |

FOREIGN PATENT DOCUMENTS

| | | |
|---|---|---|
| 1197971 | 8/1965 | Germany. |
| 4024395 A1 | 3/1991 | Germany. |
| 1409236 | 5/1983 | United Kingdom. |

*Primary Examiner*—Steven L. Stephan
*Assistant Examiner*—Michael Wallace, Jr.
*Attorney, Agent, or Firm*—Oblon, Spivak, McClelland, Maier & Neustadt, P.C.

[57] ABSTRACT

A device for holding bar ends of a stator winding in a dynamoelectric machine that has an inner ring which fits closely against the bar ends and is shaped like the inside of a cone. An outer support has at least one outer ring and a device for clamping the inner ring to the outer support. The clamping device is supported on the end face of the laminated body or on the stator housing. In order to detune the natural frequency of the winding overhang assembly, additional masses are situated between adjacent winding ends, or arranged on the external outer ring and are uniformly distributed over its circumference. The additional masses consist of a multiplicity of mutually insulated metal wires or metal strips which extend in the circumferential direction and are held together by means of an adhesive and a bandage.

6 Claims, 3 Drawing Sheets

DEVICE FOR HOLDING THE BAR ENDS OF A STATOR WINDING IN A DYNAMOELECTRIC MACHINE

BACKGROUND OF THE INVENTION

1. Field of the Invention

The invention relates to a device for holding the bar ends of a stator winding in a dynamoelectric machine, comprising a rotor and a stator, which stator has a laminated body having end clamping plates and a stator housing surrounding this laminated body and there is arranged in the laminated body in grooves a stator winding whose ends axially overlap the laminated body, which holder has an inner ring which fits closely, directly or with the interposition of a separator, against the bar ends, expanding in the manner of a hollow cone, of the stator winding, which holder further has an outer support having at least one outer ring and means for clamping the inner ring to the outer support, the means for clamping being supported on the end face of the laminated body and/or on the stator housing.

The invention refers in this case to a prior art as emerges, for example, from DE-B 1 197 971.

2. Discussion of Background

The mounting of the bar ends of the stator winding (winding overhang) of turbogenerators poses certain problems as a consequence of the large stresses to which these winding overhangs are exposed. These stresses are caused by the actions of electromagnetic forces both in continuous operation and in the case of disturbances such as, for example, in the case of short circuits, in vibrational phenomena and in differing thermal expansions of the stator bars by comparison with the stator core during operation. These loads can lead during operation or later to instances of loosening and to wear phenomena which can in the final analysis entail earth faults or short circuits.

In order to improve the strength of the winding overhangs of large electrical machines, a series of systems have been introduced which operate for the most part with one or more single-piece rings made from insulating material as a central support element.

In the device for holding the bar ends of a stator winding in an electrical machine according to DE-B 1 197 971, an inner ring is provided which fits closely, with the interposition of a separator, against the bar ends, expanding in the manner of a hollow cone, of the stator winding, these bar ends being supported for their part on support angles. The external support is performed by two outer rings. Hauling lugs and wedges are provided for the purpose of clamping the inner ring to the outer supports.

The known winding overhang support has proved itself in practice for years. However, as also with other known winding overhang holders, it has the disadvantage that its natural mechanical frequencies come to lie too close to the exciting frequencies because of the mechanical running and/or the electrodynamic forces (for example 50 and 100 Hz in the case of a 50 Hz machine), be this as a consequence of production-induced influences or as a consequence of ageing phenomena and settling phenomena during operation.

SUMMARY OF THE INVENTION

Accordingly, one object of this invention is to provide a novel holder of the generic type mentioned at the beginning which permits detuning of the winding overhang connection in the direction of lower natural frequencies in an economic and technically simple way without the need for extensive disassembling work.

The object is achieved according to the invention when additional masses which are respectively situated between adjacent winding bar ends are arranged on the outer ring, uniformly distributed over the circumference thereof.

These additional masses preferably consist of a multiplicity of metal wires or metal strips which are held together mutually by an adhesive and are detachably connected to the said outer ring. They are preferably mounted on the end face of the outer ring which faces the stator clamping plate by means of screws made from a nonmagnetic material. The subsequent attachment of the additional masses requires only comparatively little outlay. In addition to the production of the additional masses, all that is required is to provide the mounting bores in the outer ring of the machine, an activity which can be carried out on site using hand tools.

The advantage of the invention is to be seen, in particular, in that in this way the natural frequency of the winding overhang can be depressed using simple means. Owing to the special construction of the additional masses, no additional electric losses arise in the overhang space. Moreover, the additional masses impair the flow of cooling air in the winding overhang only insubstantially.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
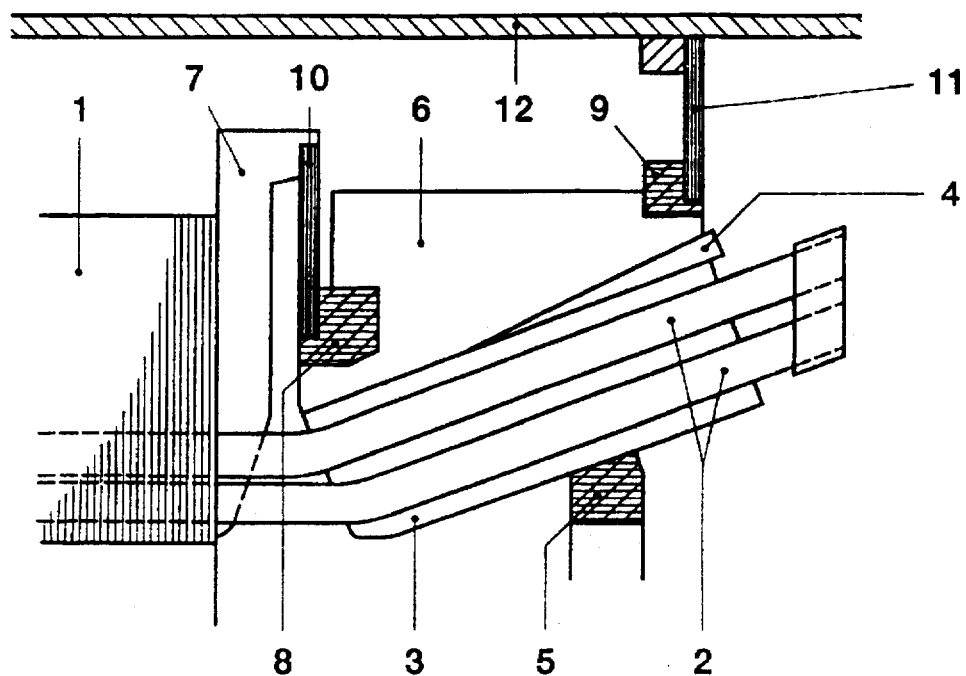
FIG. 1 shows a simplified longitudinal section through the winding overhang of a known turbogenerator having an inner ring and an internal and an external outer ring.
Figure 1:
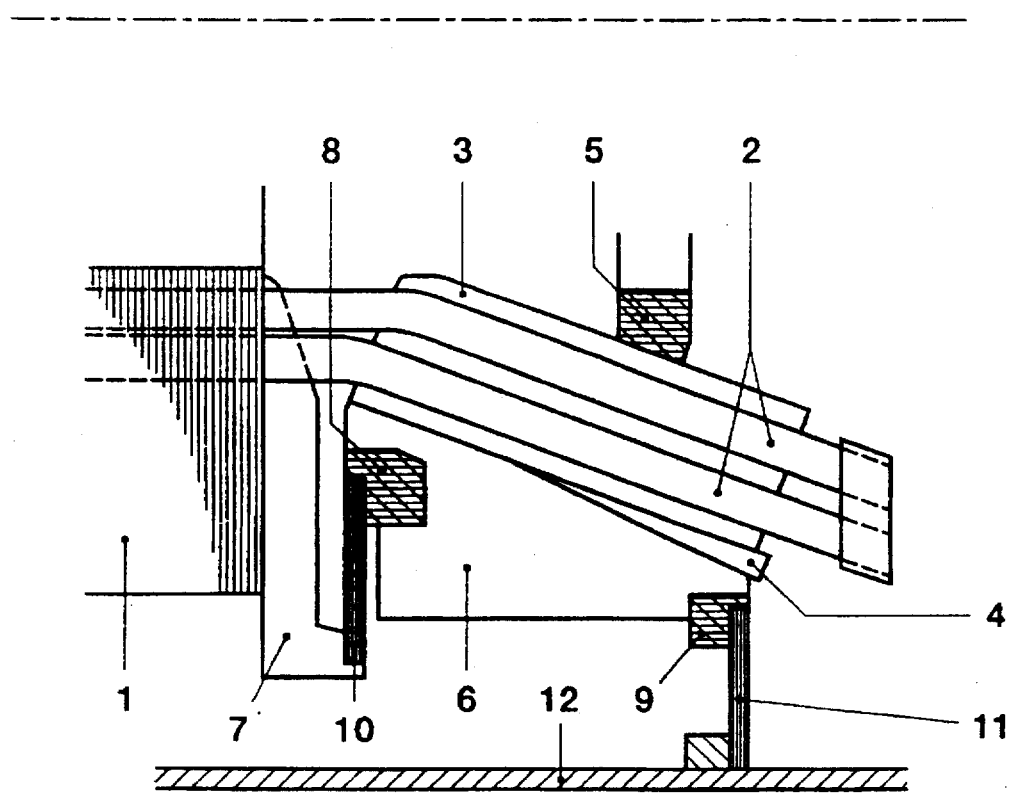

Referring now to the drawings, wherein like reference numerals designate identical or corresponding parts throughout the several views, in the simplified longitudinal section through the end part of a known turbogenerator in FIG. 1, 1 designates the stator laminated body and 2 the stator winding bars. The latter are held together by means of hauling lugs 3, displaceable wedges 4 and an inner ring 5, and they are supported radially outwards on a number of support angles 6 distributed uniformly in the circumferential direction. The external support is produced by an internal outer ring 8 and an external outer ring 9. The internal outer ring 8 is not directly connected to the end face of the stator clamping plate 7, but is connected to the stator clamping plate 7 via first radially extending sets 10 of leaf springs. In an analogous way, the external outer ring 9 is connected to the stator housing 12 via second radially extending sets 11 of leaf springs. Both sets 10, 11 of leaf springs project in this case into the distances between adjacent support angles 6 and are screwed there to the rings 8 and 9.

The support described can be produced directly in this way for the axial movements of the winding overhang as a consequence of the thermal expansion of the winding bars 2 with respect to the stator laminated body 1, as a result of which the service life of the bar insulation, in particular in the winding overhang radii, is increased, as also is the short-circuit strength of the winding overhang. Radially, the support is nevertheless "hard".

Supports for the stator winding overhangs of turbogenerators are known to this extent (DE-B 1 197 971).

As explained at the beginning, the change in the natural frequency towards lower values is not permitted to overshoot specific limits, and is thus not permitted in the case of 50 Hz machines to closely approach 50 Hz or 100 Hz.

This is where the invention comes in. Instead of strengthening, or even exchanging, the elements which determine the stiffness of the winding overhang support, which would be attended by a high outlay, the invention provides for additional masses 13 which are respectively situated between adjacent bar ends and are screwed to the external outer ring 9 to be arranged on the external outer ring 9, uniformly distributed over the circumference thereof.

Figure 2:
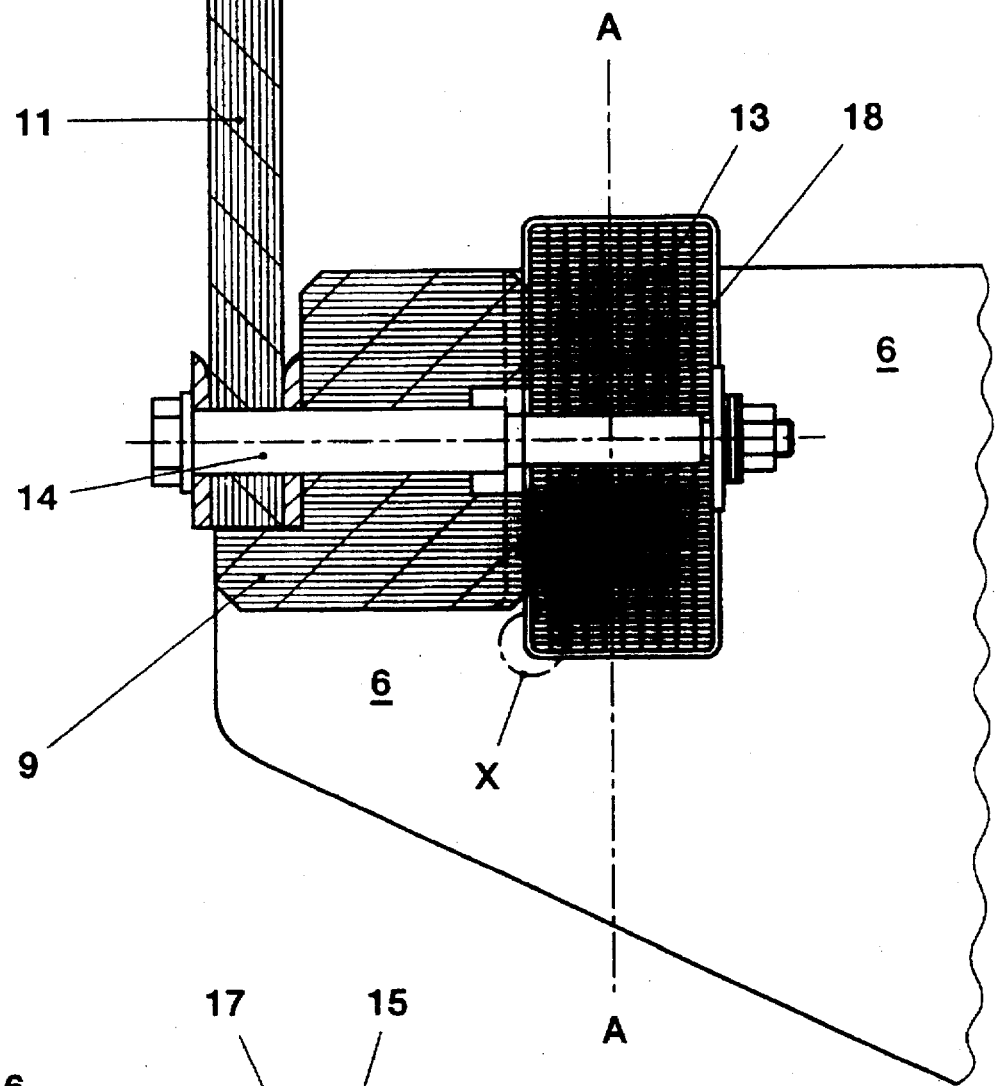
FIG. 2 shows a section, enlarged by comparison with FIG. 1, having an exemplary embodiment of the invention having additional masses which are mounted on the external outer ring.

It is effectively to be seen in FIG. 2 that the additional mass 13 is screwed from inside by means of respectively two bolts 14 made from nonmagnetic material jointly to the external outer ring 9 and in part to the second set 11 of leaf springs.

Figure 3:
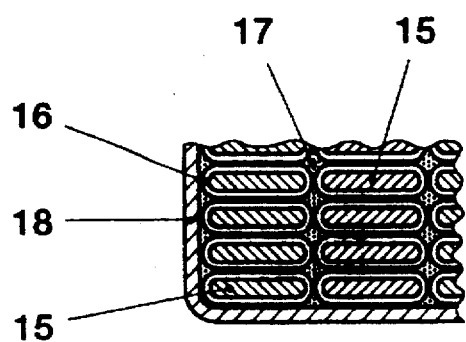
FIG. 3 shows the detail X from FIG. 2, which illustrates the structure of the additional masses.
Figure 4:
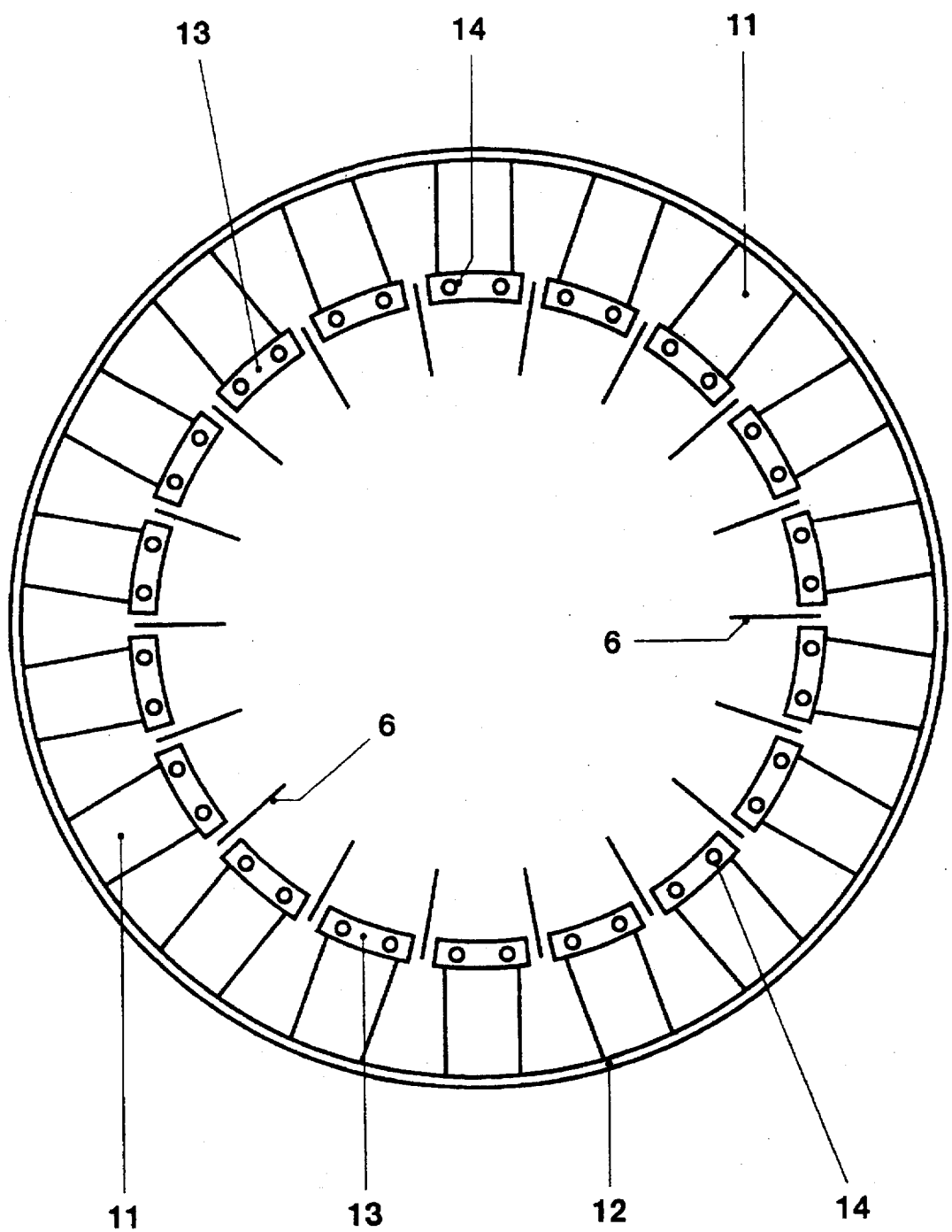
FIG. 4 shows a cross section through the winding overhang in accordance with FIG. 2 along the line AA therein, the stator winding bars having been omitted.

These additional masses 13—their arrangement and distribution follows from FIG. 4—consist of a multiplicity of metal wires or metal strips 15 (FIG. 3, which shows the detail X from FIG. 2), preferably made from copper conductors, as they are used for the stator winding. The individual conductors 15 are mutually insulated by means of a lacquer layer or other thin insulating layer 16, and are held together by means of an adhesive 17 and a bandage 18, surrounding all the conductors 15, made from insulating material. The subdivision of the additional mass 13 into many "thin" part conductors 15 prevents the production of high additional losses (eddy-current losses) due to the magnetic winding overhang field.

It is preferred for the additional masses 13 to be produced in accordance with the following method.

Insulated conductors made from flat copper are wound in a mold to form a ring, the ring is bandaged, and the whole is impregnated with impregnating resin and cured at increased temperature and with the application of pressure, a method such as has been applied for a long time in the production of conductor bars, constructed from part conductors, for large electrical machines. After curing, the ring is cut up into an appropriate number of segments which are respectively provided with bores. Alternatively, the segments can also be produced individually.

The subsequent attachment of the additional masses 13 requires only comparatively little outlay. In addition to the production of the additional masses, all that is required is to provide the mounting bores in the outer ring 9 of the machine, an activity which can be carried out on site using hand tools.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A device for holding bar ends of a stator winding in a dynamoelectric machine, comprising a rotor and a stator, said stator having a stator laminated body having end clamping plates and a stator housing surrounding said laminated body, the laminated body having grooves for mounting stator windings whose ends axially overlap the laminated body, said holder including an inner ring which fits closely, directly or with the interposition of a separator, against the bar ends of said stator windings, said bar ends expanding in the manner of a hollow cone, said holder further has an outer support having at least one outer ring, which is called a first outer ring, and means for clamping the inner ring to the outer support, the means for clamping being supported on the end face of the laminated body and on the stator housing, wherein a plurality of additional masses are arranged on a second outer ring, said second outer ring being fixed to said first outer ring and said plurality of additional masses being fixed to said second outer ring uniformly distributed over a circumference of said second outer ring.

2. The device as claimed in claim 1, wherein the additional masses consist of a multiplicity of metal wires or metal strips which extend in a circumferential direction and are held together by means of an adhesive and a bandage.

3. The device as claimed in claim 2, wherein the metal wires and metal strips are respectively surrounded by an insulating layer.

4. The device as claimed in claim 1, wherein the additional masses are mounted on the end face of the said outer ring which faces the stator laminated body.

5. The device as claimed in claim 2, wherein the additional masses are mounted on the end face of the said outer ring which faces the stator laminated body.

6. The device as claimed in claim 3, wherein the additional masses are mounted on the end face of the said outer ring which faces the stator laminated body.

* * * * *